(12) United States Patent
Groeneweg et al.

(10) Patent No.: US 11,948,477 B2
(45) Date of Patent: Apr. 2, 2024

(54) EMERGENCY RESPONSE BARRIER

(71) Applicant: Concaten, Inc., Golden, CO (US)

(72) Inventors: Kevin K. Groeneweg, Golden, CO (US); Taylor Groeneweg, Golden, CO (US)

(73) Assignee: Concaten, Inc., Golden, CO (US)

( * ) Notice: Subject to any disclaimer, the term of this patent is extended or adjusted under 35 U.S.C. 154(b) by 0 days.

(21) Appl. No.: 17/991,681

(22) Filed: Nov. 21, 2022

(65) Prior Publication Data

US 2023/0092342 A1    Mar. 23, 2023

Related U.S. Application Data

(63) Continuation-in-part of application No. 17/875,955, filed on Jul. 28, 2022.

(60) Provisional application No. 63/227,256, filed on Jul. 29, 2021.

(51) Int. Cl.
| | |
|---|---|
| *G09F 21/04* | (2006.01) |
| *B60P 3/22* | (2006.01) |
| *B60R 19/38* | (2006.01) |
| *B62D 25/02* | (2006.01) |
| *B62D 53/06* | (2006.01) |

(52) U.S. Cl.
CPC .......... *G09F 21/048* (2013.01); *B60P 3/2205* (2013.01); *B60R 19/38* (2013.01); *B62D 25/02* (2013.01); *B62D 53/06* (2013.01)

(58) Field of Classification Search
CPC . B60P 3/2205; B60R 19/38; B60R 2019/005; B62D 25/02; B62D 53/06; B62D 21/15; B62D 33/023
See application file for complete search history.

(56) References Cited

U.S. PATENT DOCUMENTS

| | | | |
|---|---|---|---|
| 7,572,022 | B2 | 8/2009 | Groeneweg |
| 7,901,117 | B2 | 3/2011 | Groeneweg |
| 8,322,945 | B2 | 12/2012 | Groeneweg et al. |
| 8,465,047 | B2 | 6/2013 | Groeneweg |
| 8,628,110 | B2 | 1/2014 | Groeneweg |
| 8,657,525 | B2 | 2/2014 | Groeneweg et al. |

(Continued)

OTHER PUBLICATIONS

International Search Report and Written Opinion of the ISA in co-pending case PCT/US21/038676.

*Primary Examiner* — Paul N Dickson
*Assistant Examiner* — Matthew Joseph Ganci
(74) *Attorney, Agent, or Firm* — Carl A. Hjort, III

(57) ABSTRACT

An emergency response barrier is shown and described, the barrier having a cab and engine for propelling the barrier; a frame with reinforcing bracing; two axles coupled to the frame with wheels attached thereto; wherein the frame is covered with a substantially planar skin that extends along the right and left sides of the frame, from a top of the frame down to a lower edge and covers a majority of the wheels on each side of the barrier; an impact attenuator coupling on the frame, having a vertical pin received in a bore disposed on an impact attenuator, and configured for rotation about the vertical axis of the pin; and a hydraulic cylinder connected between the frame and the impact attenuator, wherein retraction and extension of the hydraulic cylinder moves the impact attenuator through an arc of rotation about the vertical pin.

20 Claims, 18 Drawing Sheets

(56) References Cited

U.S. PATENT DOCUMENTS

| | | | |
|---|---|---|---|
| 8,740,241 B2 * | 6/2014 | Groeneweg | F41H 11/12 |
| | | | 280/411.1 |
| 8,777,255 B2 | 7/2014 | Groeneweg | |
| 8,845,229 B2 | 9/2014 | Groeneweg et al. | |
| 9,267,250 B2 | 2/2016 | Groeneweg | |
| 9,273,437 B2 | 3/2016 | Groeneweg et al. | |
| 9,394,657 B2 | 7/2016 | Groeneweg et al. | |
| 9,481,969 B2 | 11/2016 | Groeneweg et al. | |
| 9,527,539 B1 | 12/2016 | Hellbusch | |
| 9,725,858 B2 | 8/2017 | Groeneweg | |
| 9,732,482 B2 | 8/2017 | Groeneweg | |
| 10,179,981 B2 | 1/2019 | Groeneweg et al. | |
| 10,240,308 B2 * | 3/2019 | Groeneweg | E01F 15/00 |
| 10,301,787 B2 | 5/2019 | Groeneweg | |
| 10,428,474 B2 | 10/2019 | Groeneweg | |
| D871,268 S | 12/2019 | Groeneweg | |
| 10,669,681 B2 | 6/2020 | Groeneweg et al. | |
| 10,920,384 B2 | 2/2021 | Groeneweg et al. | |
| 11,384,494 B2 | 7/2022 | Groeneweg | |
| 11,512,441 B2 | 11/2022 | Groeneweg et al. | |
| 11,560,679 B2 | 1/2023 | Groeneweg et al. | |
| 11,668,059 B2 | 6/2023 | Groeneweg | |
| 2004/0120760 A1 * | 6/2004 | Carlsson | E01F 15/148 |
| | | | 404/6 |
| 2004/0145173 A1 | 7/2004 | Leonhardt et al. | |
| 2008/0258362 A1 | 10/2008 | Unrath | |
| 2009/0166998 A1 | 7/2009 | Groeneweg | |
| 2014/0239613 A1 | 8/2014 | Groeneweg | |
| 2015/0000168 A1 * | 1/2015 | Maus | B60D 1/50 |
| | | | 280/446.1 |
| 2015/0069771 A1 * | 3/2015 | Buehler | E01F 15/148 |
| | | | 293/118 |
| 2019/0100890 A1 | 4/2019 | Groeneweg | |
| 2019/0292739 A1 | 9/2019 | Groeneweg | |
| 2022/0025593 A1 | 1/2022 | Groeneweg et al. | |
| 2023/0036319 A1 | 2/2023 | Groeneweg et al. | |
| 2023/0101099 A1 | 3/2023 | Groeneweg et al. | |
| 2023/0160163 A1 | 5/2023 | Groeneweg et al. | |
| 2023/0175216 A1 | 6/2023 | Groeneweg | |

* cited by examiner

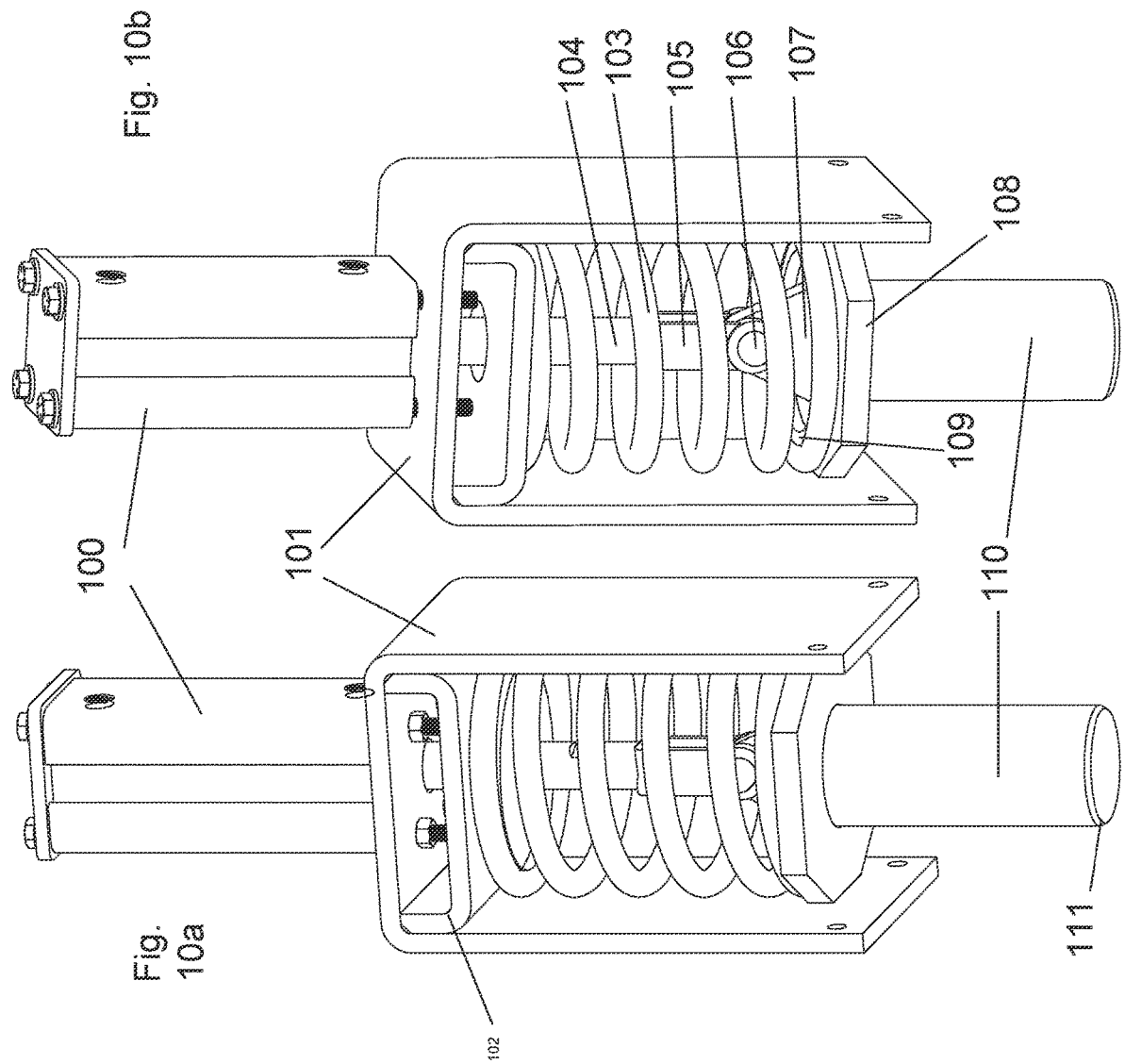

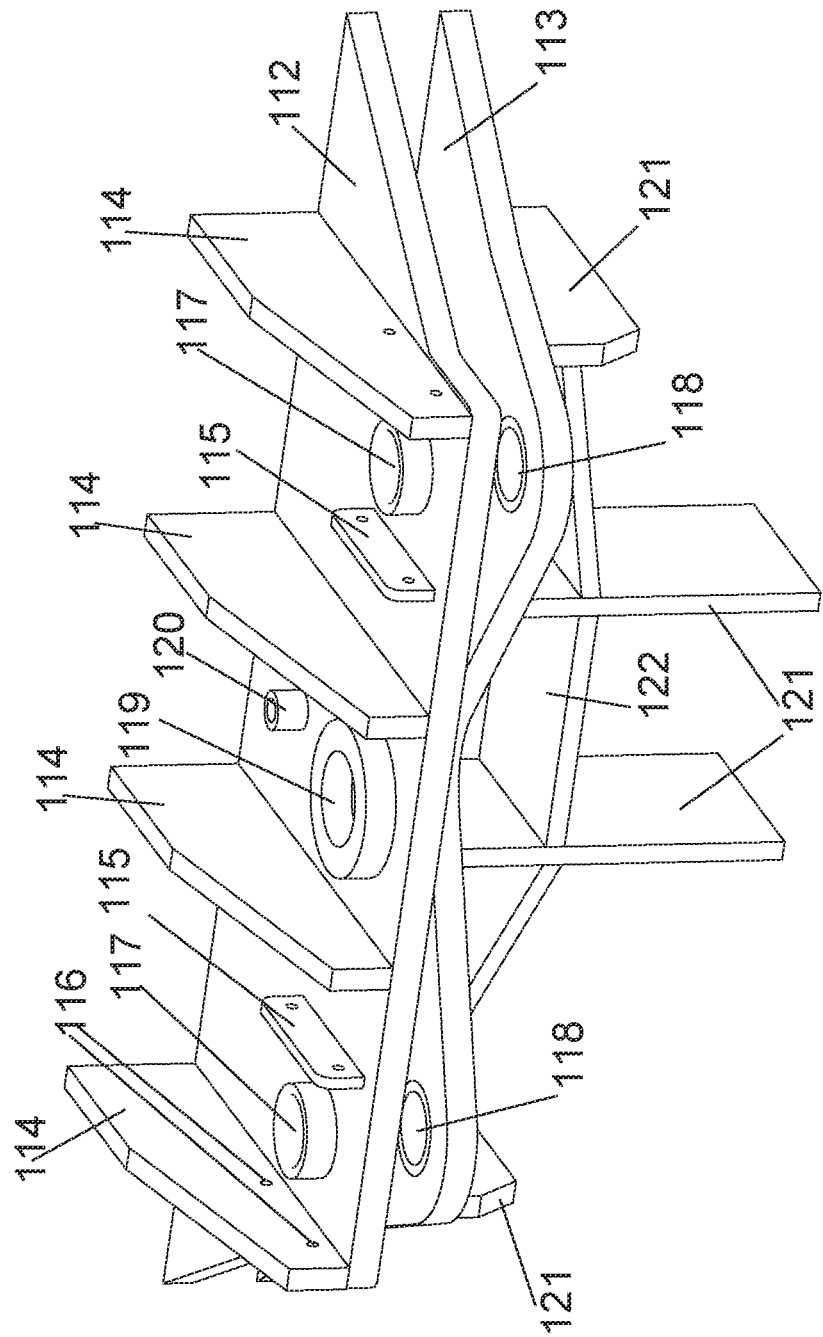

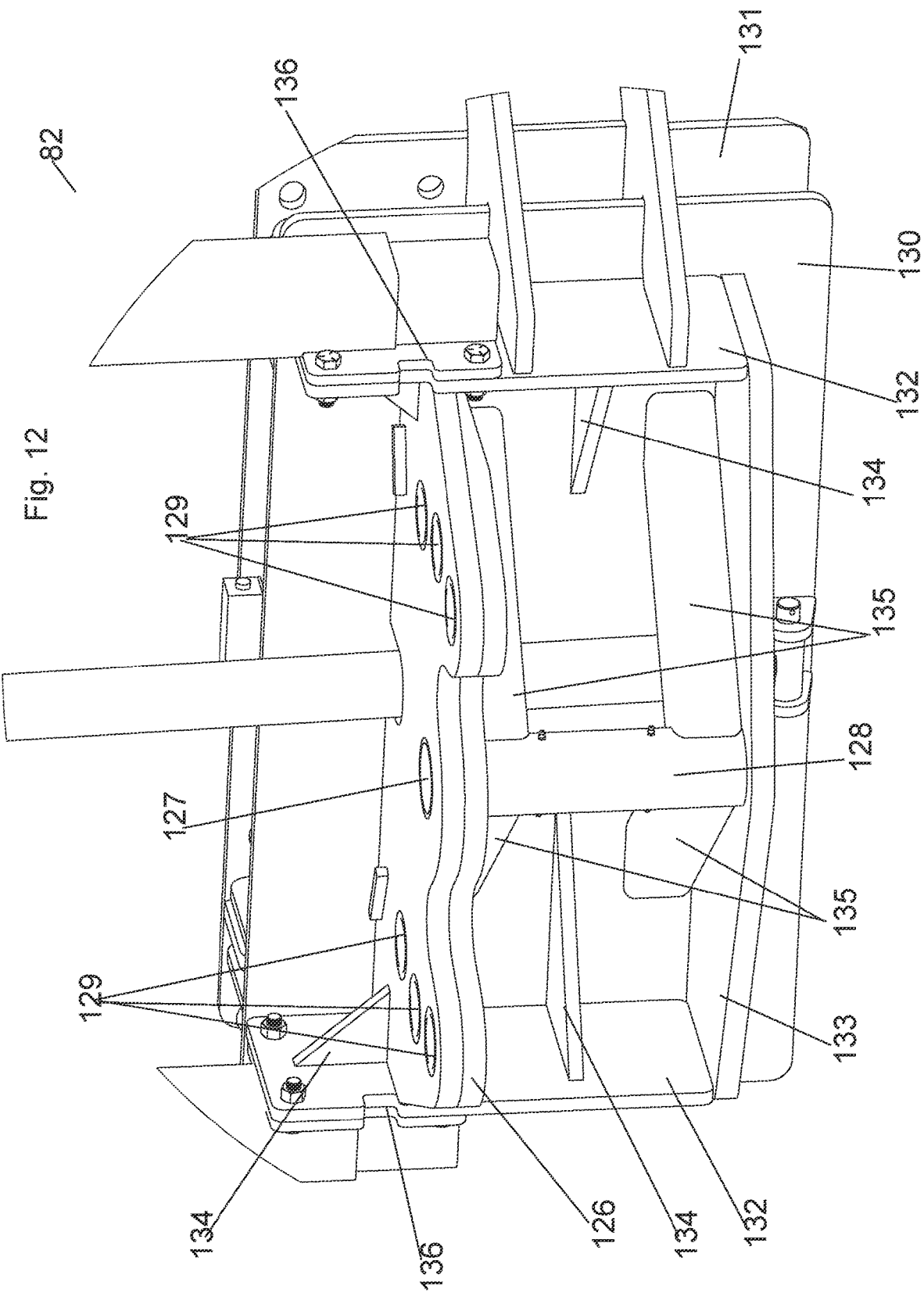

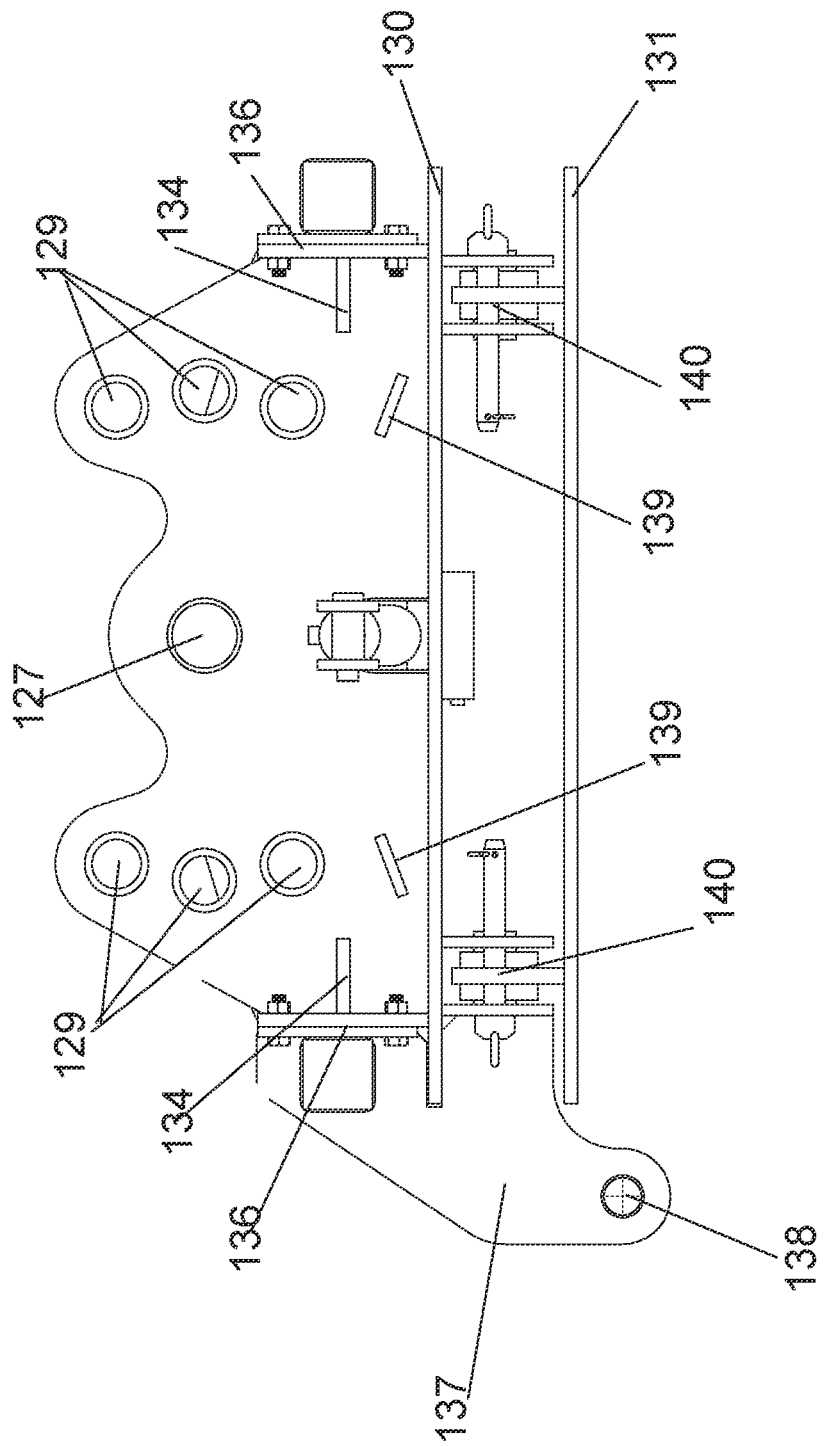

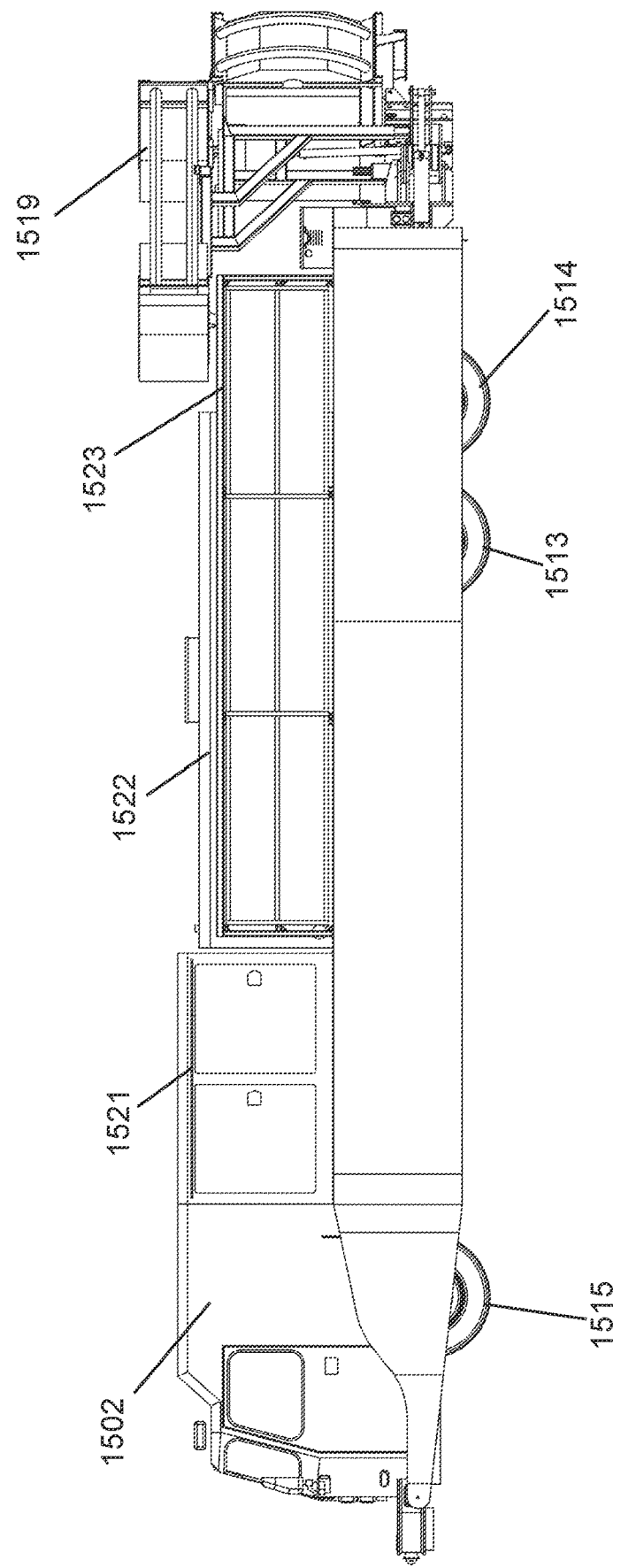

EMERGENCY RESPONSE BARRIER

CROSS-REFERENCE TO RELATED APPLICATIONS

The present application is a continuation-in-part of U.S. patent application Ser. No. 17/875,955, filed Jul. 28, 2022, which claims the benefit of U.S. Provisional Application Ser. No. 63/227,256, filed Jul. 29, 2021, both having the same title, and which are incorporated herein by this reference.

BRIEF DESCRIPTION OF THE DRAWINGS

FIGS. 10a and 10b are bottom and top perspective views respectively of the locking pin mechanisms.

FIGS. 11a-11d are views of the components of the pivot plate assembly.

FIG. 12 is a perspective view of the components of pivoting assembly.

FIG. 13 is a top view of the components of the pivoting assembly.

FIG. 17 is a left side view of a second embodiment of the emergency response barrier.

DETAILED DESCRIPTION OF THE DRAWINGS

Embodiments of an emergency response barrier are shown and described. The emergency response barrier comprises a frame having a right side, a left side, a front end and a rear end, said frame further comprising reinforcing bracing extending along the majority of the right and left sides of the frame; at least two axles coupled to the frame at the rear end thereof, each of said axles having wheels attached thereto; a king pin coupled to the front end of the frame; wherein the frame is covered with a substantially planar skin that extends along the right and left sides of the frame, wherein the substantially planar skin extends from a top of the frame down to a lower edge and wherein said substantially planar skin covers a majority of the wheels on each side of the barrier; an impact attenuator coupling on the rear of the frame, said impact attenuator coupling comprising a vertical pin, wherein said vertical pin is received in a bore disposed in an impact attenuator, and wherein said impact attenuator is configured for rotation about the vertical axis of the pin; and a plurality of hydraulic cylinders connected between the rear of the frame and the impact attenuator, wherein retraction and extension of said hydraulic cylinders moves the impact attenuator through an arc of rotation about the vertical pin.

Figure 1:
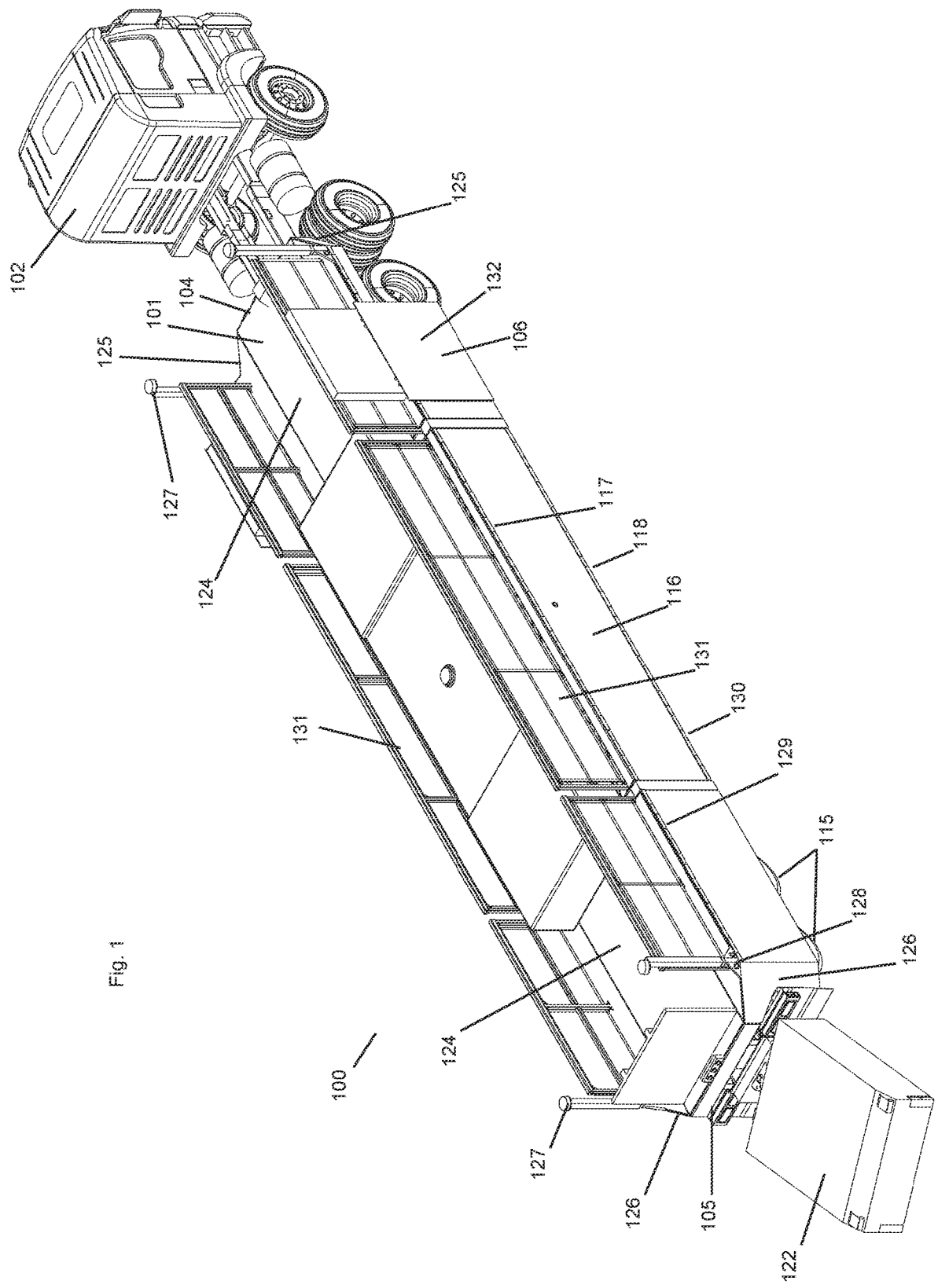
FIG. 1 is a right rear perspective view of an embodiment of the emergency response barrier.

FIG. 1-4 are a right rear perspective view, lefts side, right side and bottom view, respectively, of an embodiment of the emergency response barrier. Like numerals will be used to identify elements common to all figures. As can be seen in FIG. 1, the emergency response barrier 100 takes the form of a barrier trailer 101 which may be towed to an accident scene or the like by a tractor 102. It should be appreciated that the emergency response barrier 100 could be towed by any vehicle capable of towing the weight of the emergency response barrier 100, and any such alternate towing vehicles fall within the scope of this disclosure. While in FIGS. 1-4, a heavy duty commercial vehicle of FHWA class 8 is shown, it should be appreciated that any vehicle capable of towing the mobile barrier could be used in place of the tractor 102. If a heavy duty commercial vehicle, such as the one shown in FIGS. 1-4, is used to tow the barrier trailer 101, the barrier may be provided with a kingpin (not shown) that mates with a fifth wheel (not shown) on the tractor 101 to couple the barrier trailer 101 to the tractor 102 for towing.

Alternatively, if the barrier trailer is to be towed by another type of vehicle, e.g. a dump truck that does not have a fifth wheel capable of engaging a kingpin, an alternative hitch may be provided on the barrier trailer 101 to couple to such a vehicle. It should further be appreciated that the barrier trailer 101 may be provided with more than one type of hitch, so that it could be towed by multiple types of vehicles. By way of example and without limitation, the barrier trailer 101 could be provided with a kingpin to couple to FHWA class 8 tractors as well as another hitch to couple to suitable vehicles that do not use a kingpin for coupling. Any and all hitches that perform the function of coupling the barrier trailer 101 to a vehicle capable of towing it are included within the scope of this disclosure.

Figure 4:
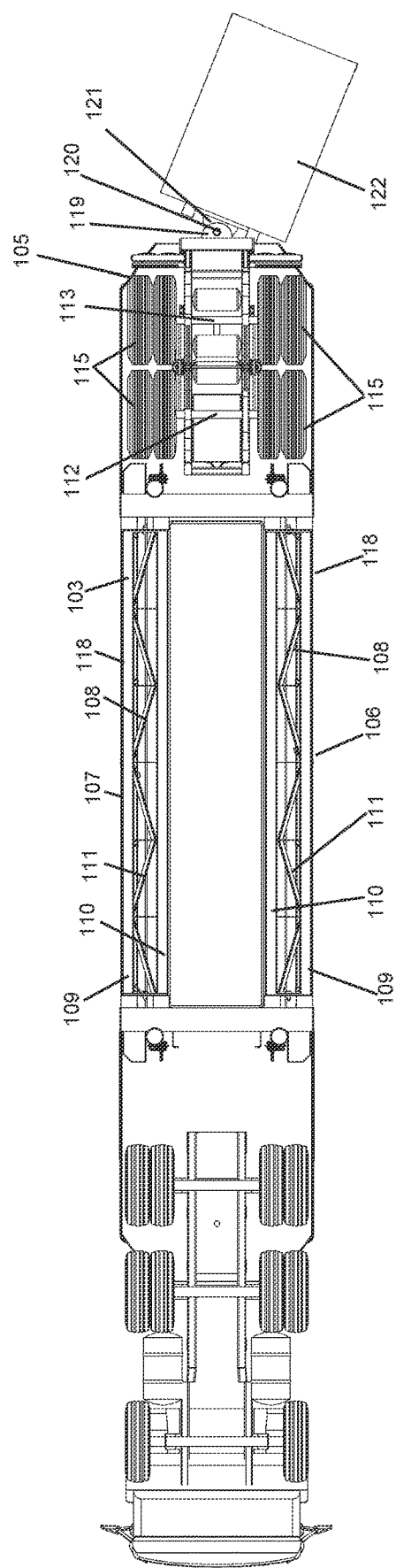
FIG. 4 is a bottom view of an embodiment of the emergency response barrier.

As can best be seen in the bottom view of FIG. 4, the emergency response barrier 100 may be provided with a frame 103. It should be appreciated that only a portion of the frame 103 is shown in FIG. 4, but that the frame 103 extends all the way from the front end 104 to the rear end 105 of the emergency response barrier 100. The frame 103 extends along the right side 106 and left side 107 of the emergency response barrier 100. The frame 103 may be further provided with reinforcing bracing 108 extending along the majority of the right and left sides, 106 and 107 respectively, of the frame 103. In one embodiment, the reinforcing bracing 108 may comprise two parallel longitudinal members, 109 and 110, with a plurality of intersecting cross-braces 111 disposed between and connected to the parallel longitudinal members 109 and 110. It should be appreciated that the area between the parallel longitudinal members 110 in FIG. 4 is an open area, and, as discussed below a water tank may be disposed in this open area.

As can be seen in FIGS. 1-4, the barrier trailer 101 may be provided with two axles, 112 and 113, coupled to the frame 103 at the rear end 105 thereof. Each of the axles 112 and 113 may be provided with wheels 115. It should be appreciated that the same axles connect the left side and right side wheels, so there is a common axle between each of the right and left side wheels, as is known in the art.

Alternatively, the left and right side wheels 115, could be coupled to the frame 103 by, for example, a fixed spindle, and without the use of an axle. Any means known in the art for coupling wheels to a frame is encompassed with this disclosure. It should be appreciated that the wheels 115 are not capable of steering, and rotate in a straight forward (or backward) direction without any articulation. In an alternative embodiment, a separate wheeled caboose (not shown) may be provided and attached to the frame 103 to provide wheels for the barrier trailer 101. Air bags may be attached to the wheels and axles to allow for the selective raising, lowering and leveling of the barrier trailer 101. Valves may be provided to hold the air suspensions settings after an air source provided by the towing vehicle has been removed. Optionally, a ballast may be provided to increase the overall weight of the barrier.

The barrier trailer 101 may also be provided with a substantially planar skin 116 that covers the frame 103. The substantially planar skin 116 extends along the right and left sides, 106 and 107 respectively, of the frame 103. Further, the substantially planar skin 116 extends from a top 117 of the frame 103 down to a lower edge 118. The substantially planar skin 116 covers a majority of the wheels 115 on each side of the barrier trailer 101. The substantially planar skin 116 performs a deflection function by presenting a smooth surface to impacting vehicles, such that they will be redirected away from barrier trailer 101 instead of entangling with the barrier trailer 101. The substantially planar skin 116 also helps to protect the barrier trailer 101 and it prevents "underrides," i.e. vehicles wedging under the barrier trailer 101. It should be appreciated that the substantially planar skin may be formed from any material of suitable strength for the application, including without limitation, steel plate, hardened aluminum, etc. The substantially planar skin 116 may be fastened to the frame 103 by any means known in the art.

Figure 7:
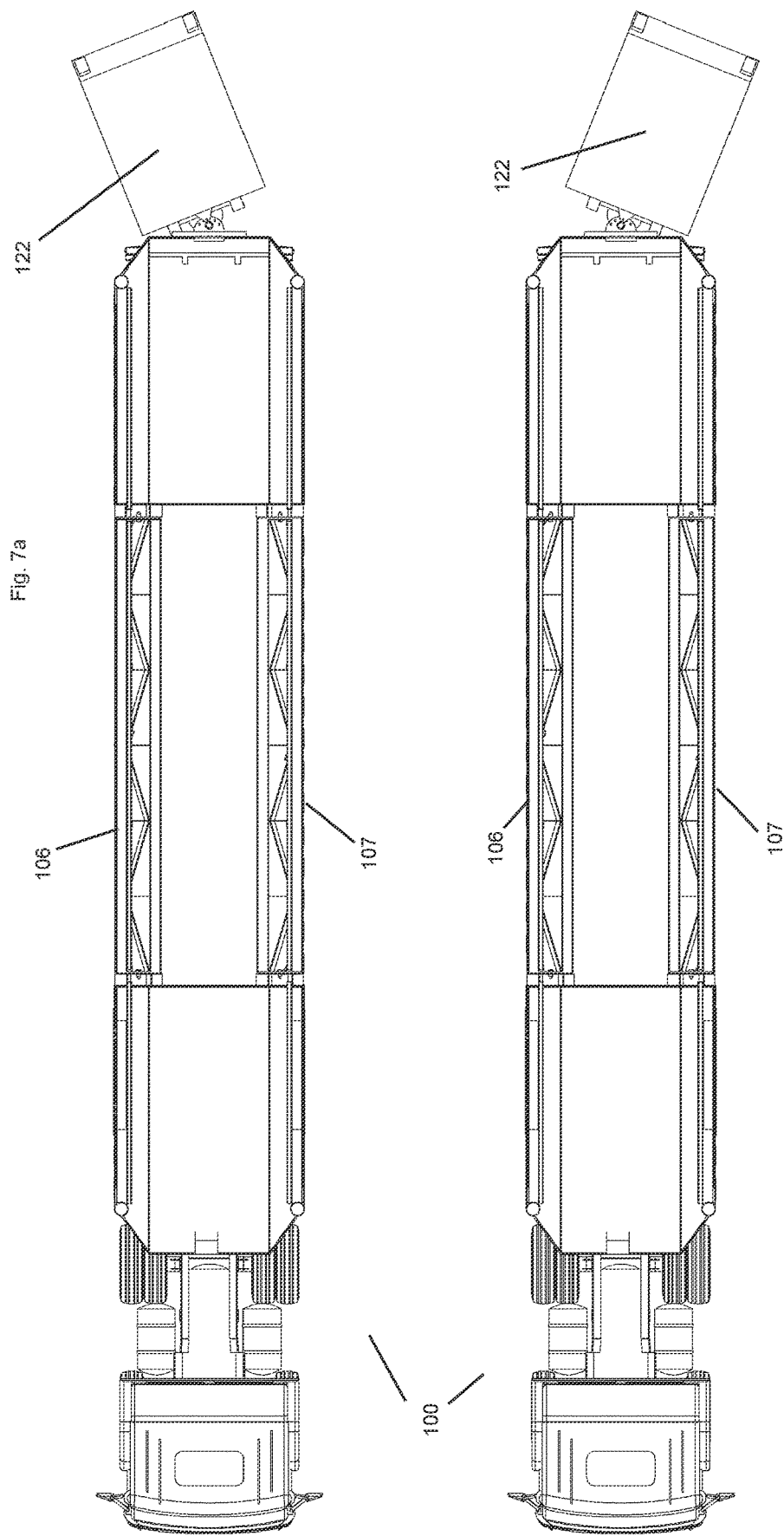
FIGS. 7a and 7b are top views of an embodiment of the emergency response barrier, showing various positions of the impact attenuator.

An impact attenuator 122 may be provided on the barrier trailer 101. The impact attenuator 122 is designed to absorb some of an impacting vehicle's kinetic energy and also to re-direct an impacting vehicle away from the barrier trailer 101. The impact attenuator 122 may, for example, be designed to partially or completely crumple to absorb kinetic energy from the impacting vehicle. The impact attenuator 122 may take the form of known attenuators in the art, or it could be specially designed for this application. An impact attenuator coupling 119 may be provided on the rear end 105 of the frame 103. An impact attenuator coupling 119 may be provided comprising a vertical pin 120. The vertical pin is received in a bore (not shown) disposed in an impact attenuator mount 121 on the impact attenuator 122. As can be seen clearly in FIGS. 1, 7*a* and 7*b*, the impact attenuator 122 is configured for rotation about the vertical axis of the pin 120. In this way the impact attenuator 122 may be disposed at an angle to the rear end 105 of the barrier trailer 101. Referring now to FIGS. 7*a* and 7*b*, which are top views of the emergency response barrier 100, it can be seen that the impact attenuator 122 can be angled toward the right side 106 (FIG. 7*a*) or left side 107 (FIG. 7*b*) of the barrier trailer 101. In this way, the emergency response barrier 100 may be parked diagonally across several lanes of traffic, and the impact attenuator may be angled in such a way that it's rear end is oriented perpendicular to the flow of traffic. In this way, the impact attenuator can perform its function of absorbing the impact of a vehicle impacting the rear of the barrier while, and the barrier can shield emergency rescue work being done in multiple lanes of traffic. The impact attenuator 122 may be provided with signage 123 to direct traffic in a direction away from the barrier. The signage 123 may be powered by a solar panel attached to the impact attenuator 122. Alternatively, or in conjunction with the solar panel, a battery pack may be provided at the rear end 104 of the barrier trailer 101 for powering the signage 123.

Referring again to FIGS. 1-4 and 7*a*-*b*, as noted above, the impact attenuator 122 may be coupled to the barrier trailer 101 by an impact attenuator coupling 119, which may consist of a vertical pin 120 received in a bore on an impact attenuator mount 121. By way of example and without limitation, the impact attenuator mount 121, may be comprised of triangular double side brackets. As will be discussed in greater detail below, one or more hydraulic cylinders may be provided on one side of the triangular double side brackets. The one or more hydraulic cylinders may either push out or pull back to adjust the impact attenuator to the left or right as shown in FIGS. 7*a*-*b*. Alternatively, the one or more hydraulic cylinders may be positioned along the frame 103 to push in or out, either through or along-side the plate covering the rear end 105 of the barrier trailer 101. In this way, the one or more hydraulic cylinders are connected between the rear end 105 of the frame 103 and the impact attenuator 122, and retraction and extension of the one or more hydraulic cylinders moves the impact attenuator through the arc of rotation about the vertical pin on the impact attenuator coupling 119. The one or more hydraulic cylinders may be any such cylinders known in the art and having a load capacity capable of moving the impact attenuator 122. In one embodiment, the one or more hydraulic cylinders may be controlled by a wireless controller. In another embodiment, the one or more hydraulic cylinders may controlled by a back-up wired controller.

Figure 2:
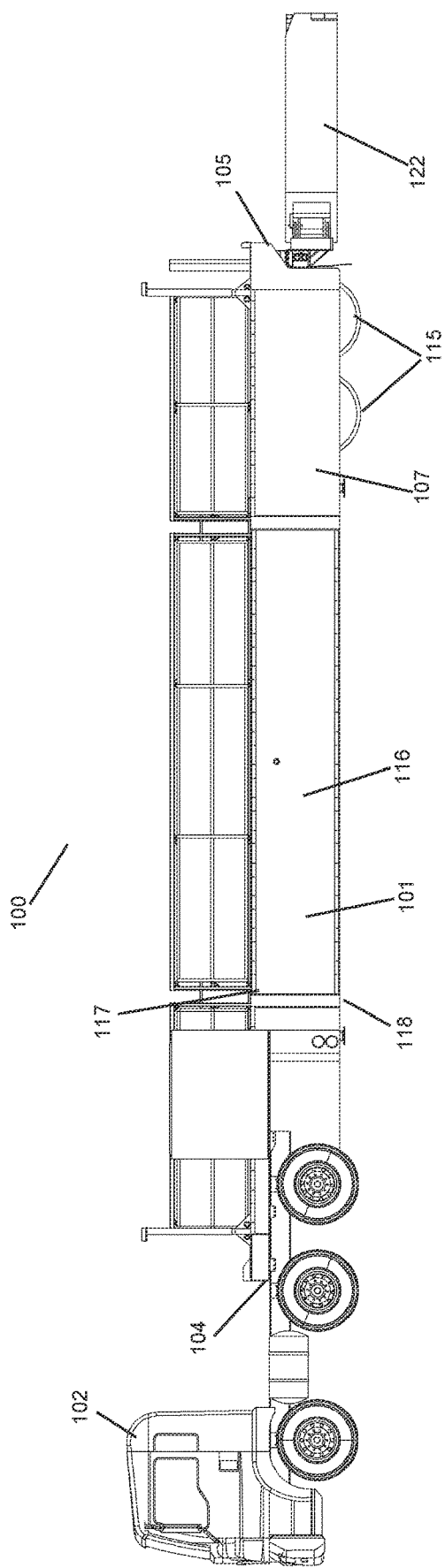
FIG. 2 is a left side view of an embodiment of the emergency response barrier.
Figure 3:
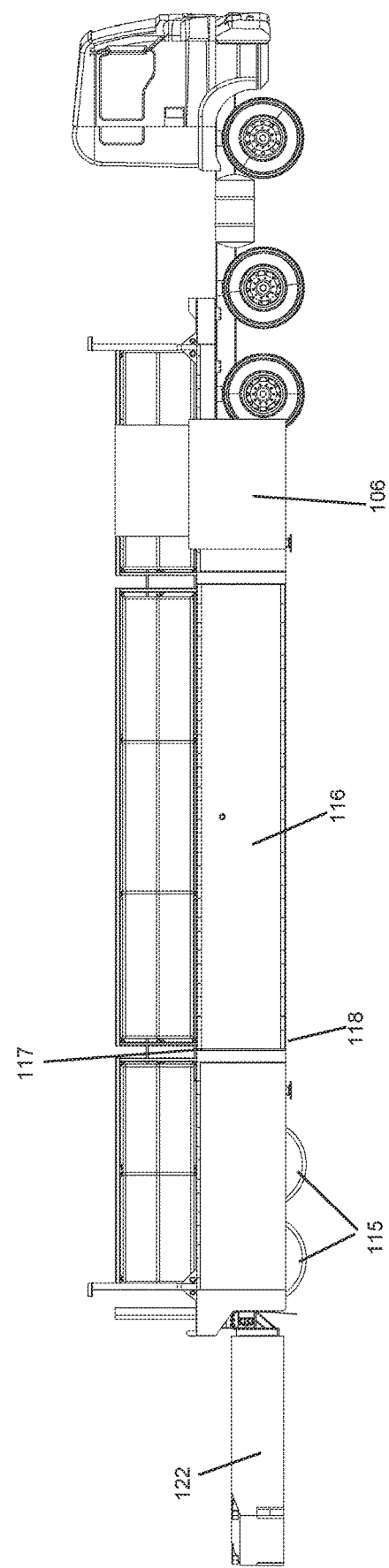
FIG. 3 is a right side view of an embodiment of the emergency response barrier.

Several other aspects of the emergency response barrier 101 are shown in FIGS. 1-3. The barrier trailer 101 may be provided with a flat deck 124 that covers the top of the frame 103. Further, the corners 125 of the frame 103 at the front end 104 are angled. In this way, the angled corners 125 prevent an impacting vehicle from snagging on the barrier trailer 101. A vehicle impacting on the angled corners 125 will be redirected away from the barrier trailer 101 instead of catching on it. It should be appreciated that angled corners 125 may also take the form of a rounded section to deflect vehicles. Similarly, the corners 126 of the frame 103 at the rear end 105 are angled and the substantially planar skin 116 follows the angle of the corners 126. Again, the angled corners 126 prevent an impacting vehicle from snagging on the barrier trailer 101. A vehicle impacting on the angled corners 126 will be redirected away from the barrier trailer 101 instead of catching on it. It should be appreciated that angled corners 126 may also take the form of a rounded section to deflect vehicles.

The barrier trailer 101 may be provided with a tank of firefighting chemicals (not shown). In one embodiment this tank of firefighting chemicals may be disposed on the flat deck 124. Alternatively, or in conjunction with the tank of firefighting chemicals, storage boxes (not shown) may be provided and disposed on the flat deck 124. Additionally, several warning light systems may be employed on the barrier trailer 101. For example, warning beacons 127 may be provided at the corners 125, 126 of the barrier trailer 101. Running lights 128, LED strips 129 and conspicuity tape 130 may be provided on the substantially planar skin 116 on the left and right sides, 106, 107, respectively, of the barrier. A visual barrier 131 may be attached to the top of the frame 103 along the right and left sides, 106 and 107, respectively.

The visual barrier 131 may be received in pockets (not shown) disposed along the left and right edges of the top of the frame 103.

Referring again to FIGS. 1-3, the emergency response barrier 100 may be provided with retractable covers 132 disposed on the left and right sides, 106, 107 and at the front end 104 of the barrier trailer 101. In FIGS. 1-3, the retractable covers 132 are shown in the retracted position. In this position, the retractable covers 132 expose the wheels of the towing vehicle 102. It should be appreciated that the retractable covers 132 also have an extended position (not shown). When the retractable covers 132 are in an extended position, they cover a majority of the wheels of a towing vehicle 102, in a similar way as the substantially planar skin 116 covers a majority of the wheels 115. The retractable covers 132 may be operated by a hydraulic cylinder to move them from the extended position to the retracted position, or they may simply ride in tracks, and an operator may move them manually from the extended position to the retracted position and vice versa.

Figure 5:
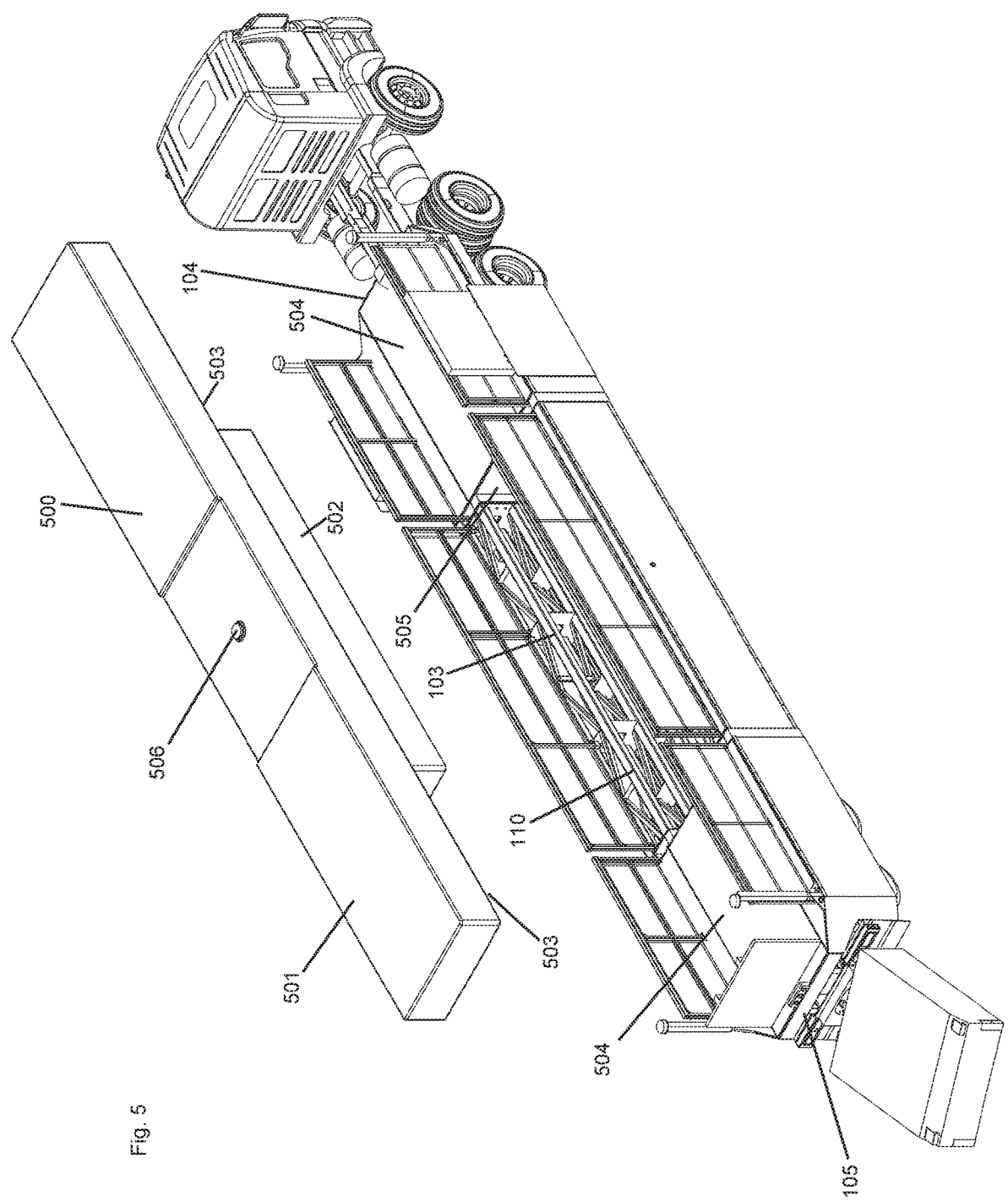
FIG. 5 is an exploded view of an embodiment of the emergency response barrier, showing a first embodiment of a water tank.
Figure 6:
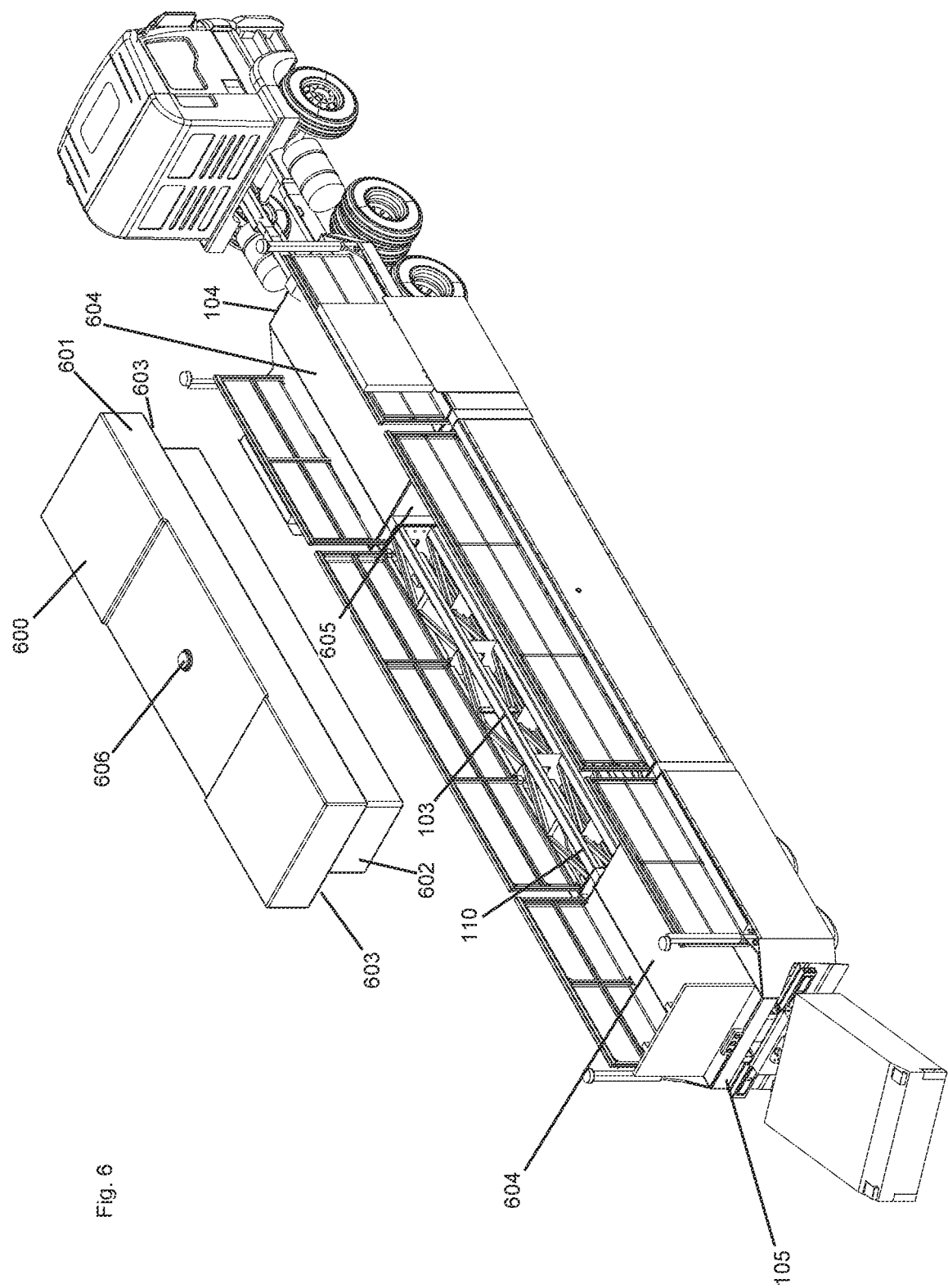
FIG. 6 is an exploded view of an embodiment of the emergency response barrier, showing a second embodiment of a water tank.

FIGS. 5 and 6 show partially exploded views of the emergency response barrier 100 with two variations of a water tank. Thus in FIG. 5, the emergency response barrier 100, as previously described, may be provided with a water tank 500. The water tank 500 may be provided with an elongated top portion 501 and a lower portion 502. When assembled, the bottom surfaces 503 of the elongated top portion 501 sit on the top of the frame 103 and extend from the front end 104 to the rear end 105. In FIG. 5, the frame is covered by a skin 504 towards the front end 104 and rear end 105, but these skins are optional, as the frame is covered by the water tank 500 when assembled. The lower portion 502 of the water tank 500 is disposed in an open area 505 between the parallel longitudinal members 110, as described above with respect to FIG. 4. The water tank 500 may be provided with a fill port 506.

Referring now to FIG. 6, a partially exploded view with another embodiment of the water tank 600 is shown. The principal difference between the water tank 500 of FIG. 5 and the water tank 600 of FIG. 6 is the size of the tank. Similar to the embodiment shown in FIG. 5, the water tank 600 may be provided with an elongated top portion 601 and a lower portion 602. When assembled, the bottom surfaces 603 of the elongated top portion 601 sit on the top of the frame 103, however, they do not extend all the way from the front end 104 to the rear end 105. In FIG. 6, the frame is covered by a skin 604 towards the front end 104 and rear end 105. The lower portion 602 of the water tank 600 is disposed in an open area 605 between the parallel longitudinal members 110, as described above with respect to FIG. 4. The water tank 600 may be provided with a fill port 606.

Both of the water tanks 500 and 600, shown in FIGS. 5 and 6 respectively, may be secured to the reinforcing bracing 108. One of ordinary skill in the art will readily appreciate that the water tanks 500 and 600 may be secured to the reinforcing bracing 108 by any means known in the art, including and without limiting the foregoing by straps (not shown) that attach to the reinforcing bracing 108. Further, the water tanks 500 and 600 may be provided with a T-shaped outlet (not shown) oriented toward the front end of the frame 104. This T-shaped outlet allows the water in water tanks 500 and 600 to be accessed from either side of the emergency response barrier 100, depending on its orientation to on-coming traffic and an accident scene.

Figure 8:
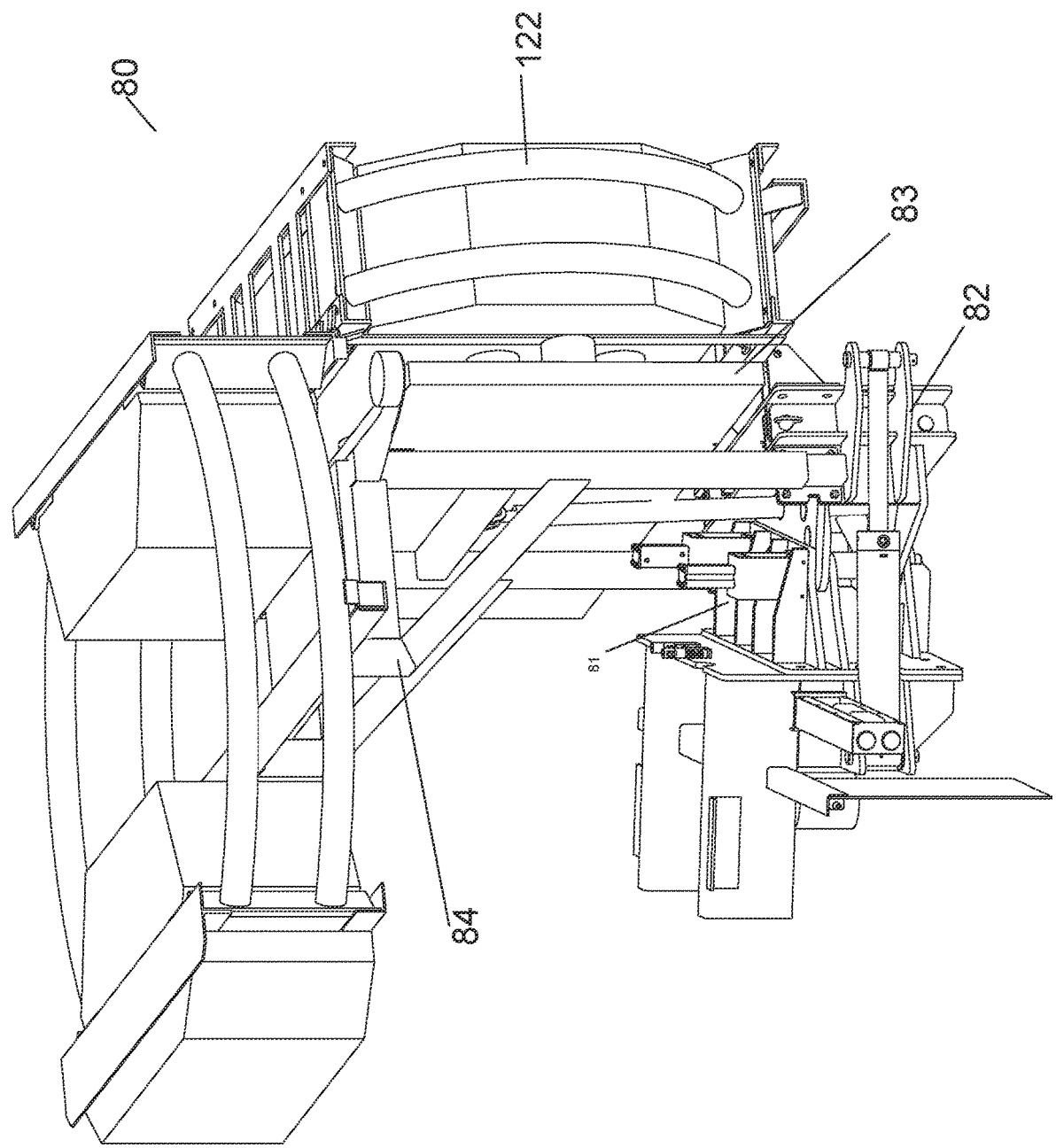
FIG. 8 is a perspective view of an embodiment of the adjustable impact attenuator assembly.

Referring now to FIGS. 8 through 14, the structure for attaching the impact attenuator to barrier trailer 101, to allow for the adjustability of angle of the impact attenuator is disclosed. FIG. 8 shows a perspective view of the adjustable impact attenuator assembly 80, which is comprised of a rear end mount 81 and a pivoting assembly 82, to which the impact attenuator 122 is mounted. Also included in the adjustable impact attenuator assembly 80 is a light board 83 for use when the impact attenuator 122 is in a deployed position and a rack 84 for supporting the impact attenuator 122 is in an un-deployed position.

Figure 9:
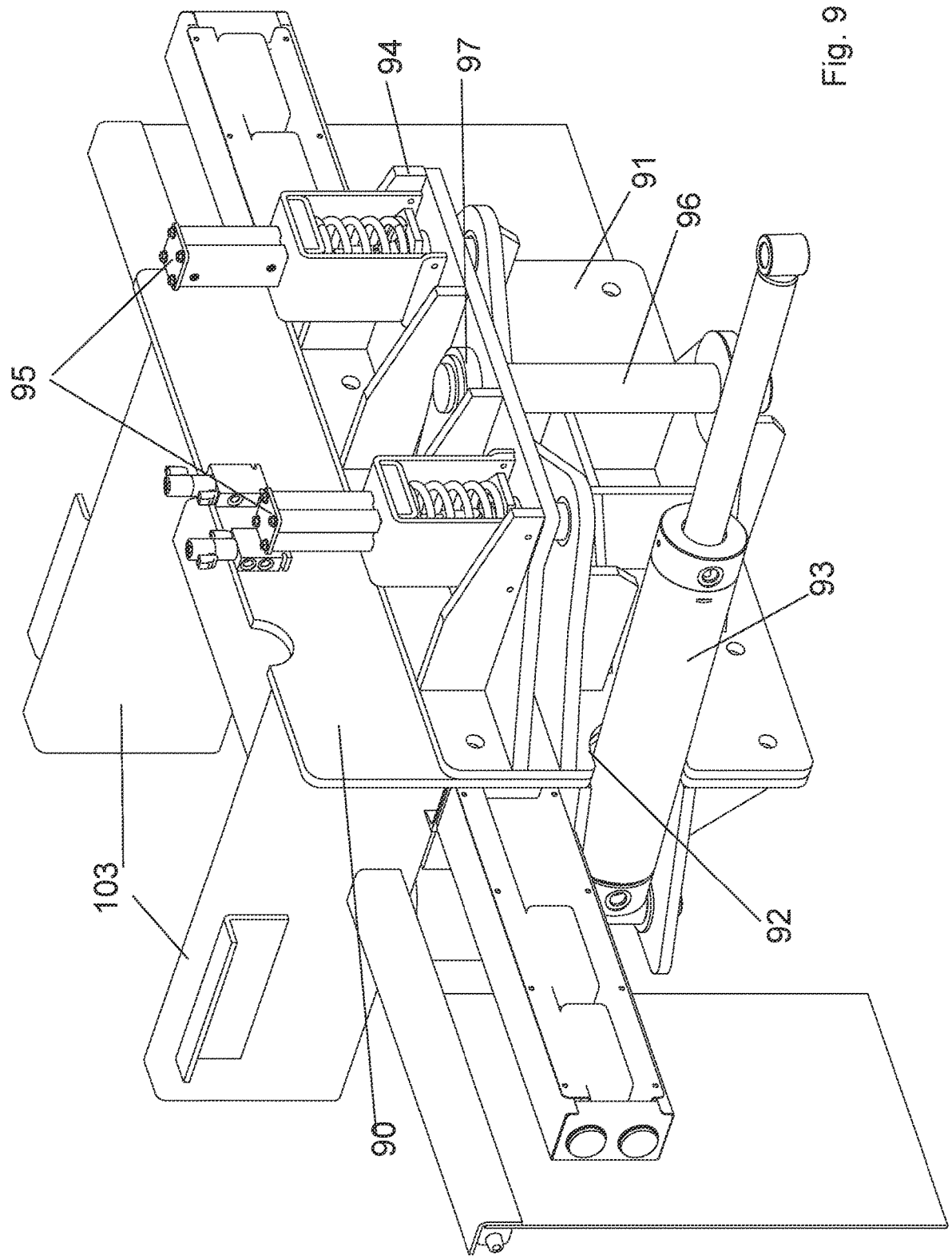
FIG. 9 is a perspective view of the rear end mount portion of the adjustable impact attenuator assembly.

FIG. 9 shows a perspective view of the rear end mount 81 portion of the adjustable impact attenuator assembly 80. The frame members 103 are visible in FIG. 9 and they are connected to a rear plate 90 that forms part of the rear end of the barrier trailer 101. Mounted to the rear plate 90 is the mounting plate 91, to which the rest of the rear end mount components are attached. The rear plate 90 and the mounting plate 91 may have a notch 92 disposed in the side to allow for the hydraulic cylinder 93 to pass through. By way of example and without limitation, hydraulic cylinder 93 may be a 5 inch bore by 20 inch stroke, being 32 inches retracted and 52 inches extended. Attached to the mounting plate 91 is the pivot plate assembly 94, which will disclosed in more detail in the description of FIG. 11. Disposed on top of the pivot plate assembly 94 are the locking pin mechanisms 95, which will be discussed in greater detail in the description of FIGS. 10a and 10b. Also shown in FIG. 9 is the central pivot pin 96. As will be discussed in greater detail with reference to FIG. 11, the central pivot pin 96 has a retainer cap 97 which engages with a reinforcing ring 119 and a tube 120 (both described below).

FIGS. 10a and 10b show bottom and top perspective views respectively of the locking pin mechanisms 95. Each of the locking pin mechanisms 95 have a hydraulic cylinder housing 100 and a spring retainer frame 101, with spacer 102. The hydraulic cylinder housing 100 contains a hydraulic cylinder, which by way of example and without limitation may be a 1.5 inch bore, 4 inch stroke compact hydraulic cylinder. The spring retainer frame 101 retains spring 103 in the proper orientation, and spacer 102 provides an area for bolting the hydraulic cylinder housing 100 to the spring retainer frame 101. By way of example and without limitation, the spring 103 may be a tempered steel spring 6 inches in length with a spring rate of 280 lbs./in. Disposed axially through the center of the spring 103 is the hydraulic cylinder shaft 104, which terminates in clevis 105. The clevis 105 is connected by a pin 106 to a vertical tab 107 on the lock pin plate 108. The lock pin plate 108 is also provided with a ring 109, that retains the spring 103 in its proper orientation. On the bottom side of the lock pin plate 108 is the lock pin 110. By way of example and without limitation, the lock pin 110 may be an appropriately sized piece of steel rod with a tensile yield of 90,000 psi such as 1141 steel, hardened 4140 steel, etc. The lock pin 110 may have a chamfer 111 at its bottom edge.

In operation, the hydraulic cylinder disposed in the hydraulic cylinder housing 100 may be operated to retract, thus pulling the lock pin 110 in an upward direction, and compressing the spring 103. As will be discussed below, this retracting of the lock pin 110 removes the lock pin 110 from engagement with certain sets of holes in the rear end mount 81 and a pivoting assembly 82, thereby allowing the hydraulic cylinder 93 to adjust the angle of the impact attenuator. When the desired angle is achieved, the hydraulic cylinder disposed in the housing 100 may be released, and the force of the spring 103 will then force the lock pin 110 into engagement with holes in the rear end mount 81 and a pivoting assembly 82, thereby locking the orientation of the impact attenuator. While not shown, it should be appreciated that an appropriate sensor may be disposed on the locking pin mechanism 95. For example, a reed sensor may be mounted via an appropriate bracket and provided with an appropriate electrical feed for operation. The reed sensor may sense the position of the lock pin 110, and provide via an LED a visual indication of whether or not the lock pin 110 is fully seated when the mechanism is in the locked position.

Figure 11B:
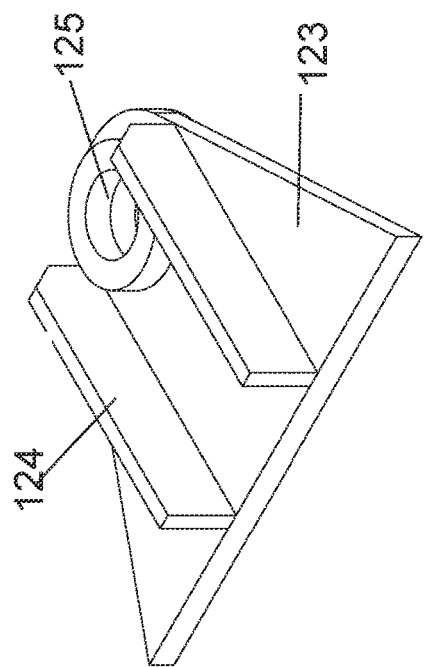
Figure 11C:
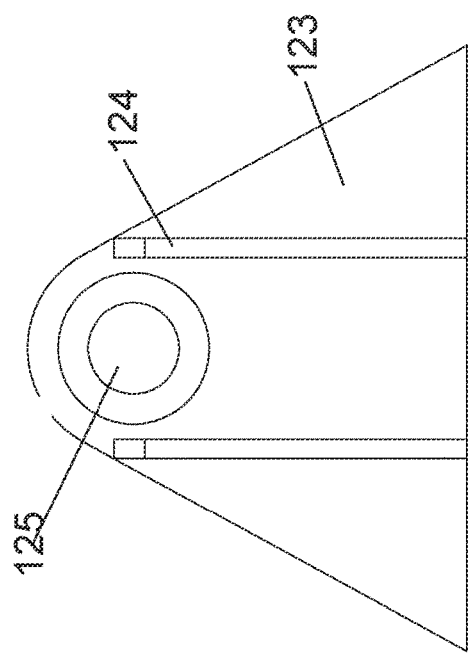
Figure 11D:
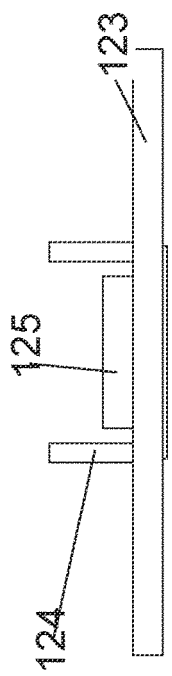

FIGS. 11a-d show the pivot plate assembly 94 in more detail. As can be seen in FIG. 11a the assembly 94 may be provided with a top pivot plate 112 and a lower pivot plate 113. The top pivot plate 112 may be provided with a plurality of strengthening gussets 114. Additionally, the top pivot plate 112 may be provided with locking pin mechanism brackets 115. Two locking pin mechanisms 95 may be secured to the top pivot plate 112 by bolting the locking pin mechanisms to the locking pin mechanism brackets 115 and to holes 116 on the strengthening gussets 114. Two holes with sleeves 117 are provided in the top pivot plate 112. The two holes with sleeves 117 are aligned with similar holes with sleeves 118 in the lower pivot plate 113. When fully assembled, the lock pins 110 of the locking pin mechanisms 95 pass through holes with sleeves 117, through a hole in the pivoting assembly 82 (described below) and into holes with sleeves 118, thereby locking the pivoting assembly 82 in relation to the rear end mount 81. The top pivot plate 112 is also provided with a reinforcing ring with hole 119, for holding the central pivot pin 96 and a tube 120 which retains the top of central pivot pin. The pivot plate assembly 94 may also be provided with lower vertical gussets 121 and horizontal gusset 122 to further strengthen the assembly. Finally, as can be seen in FIGS. 11b-d, a bottom pivot plate 123 may be provided, with strengthening gussets 124 and a reinforcing ring with hole 125. The reinforcing ring with hole 125 accepts the central pivot pin and provides a second point of attachment of the central pivot pin to the pivot plate assembly 94.

FIG. 12 is a partial perspective view of the components of pivoting assembly 82. The pivoting assembly 82 may be provided with a pivoting assembly plate 126, having a central pivot hole 127 and central pivot tube 128. It should be appreciated that the pivoting assembly 82 is coupled to the rear end mount 81 by the central pivot pin 96. When assembled, pivoting assembly plate 126 is disposed between the top pivot plate 112 and the lower pivot plate 113. The central pivot pin 96 passes through reinforcing ring with hole 119 in the top pivot plate 112, through central pivot hole 127 in the pivoting assembly plate 126, through the central pivot tube 128 and further into reinforcing ring with hole 125 in the bottom pivot plate 123. In this arrangement, the pivoting assembly 82 may pivot around the central pivot pin and move in an arc of rotation about the vertical axis thereof. Also disposed on the pivoting plate assembly 126 are locking pin holes 129. As discussed above, when the pivoting assembly 82 is positioned in the desired orientation, the lock pins 110 of the locking pin mechanisms 95 pass through holes with sleeves 117 in the top pivot plate 112, through one of the locking pin holes 129 in the pivoting assembly 82 and into holes with sleeves 118 in the lower pivot plate 113 thereby locking the pivoting assembly 82 in relation to the rear end mount 81. The locking pin holes 129 may be provided with sleeves to strengthen them, and sleeves may be by way of example and without limitation A513-Type 5 DOM tube sized to provide an appropriate clearance fit between the sleeves and lock pin 110.

The remaining structural components in FIG. 12 are used to strengthen the assembly and mount the attenuator. Thus, the pivoting assembly 82 has a main plate 130 to which the previously recited components are attached. The pivoting assembly 82 also has an attenuator attachment plate 131 to which the attenuator 112 (not shown in FIG. 12) is attached. Side plates 132 and bottom plate 133 are also provided. Though not visible in FIG. 12, it should be appreciated that bottom plate 133 has a hole therein through which the central pivot pin 96 passes. Reinforcing gussets 134 are also provided in the pivoting assembly 82. Reinforcing tubes 135 provide further structural support to the assembly. Finally, mounts 136 for the rack 84 are provided as shown in FIG. 12.

FIG. 13 is a top view of the components of the pivoting assembly. Like numerals will be used to identify components already discussed. Thus, FIG. 13 shows the pivoting assembly plate 126, having a central pivot hole 127. Also visible in FIG. 13 are the locking pin holes 129. The main plate 130 and the attenuator attachment plate 131 are shown, as are the reinforcing gussets 134 and the mounts 136 for the rack 84. Also visible in FIG. 13 is the hydraulic cylinder bracket upper plate 137. The hydraulic cylinder bracket upper plate 137 may be provided with a hole 138 to accept a pin (not shown in FIG. 13) which connects the hydraulic cylinder 93 to the pivoting assembly 82. The pivoting assembly 82 may also be provided with rotational stop 139, which constrain the arc of rotation of the pivoting assembly 82 when in operation. Finally, quick-disconnect mechanisms 140 may be provided to quickly change the attenuator if necessary.

Figure 14:
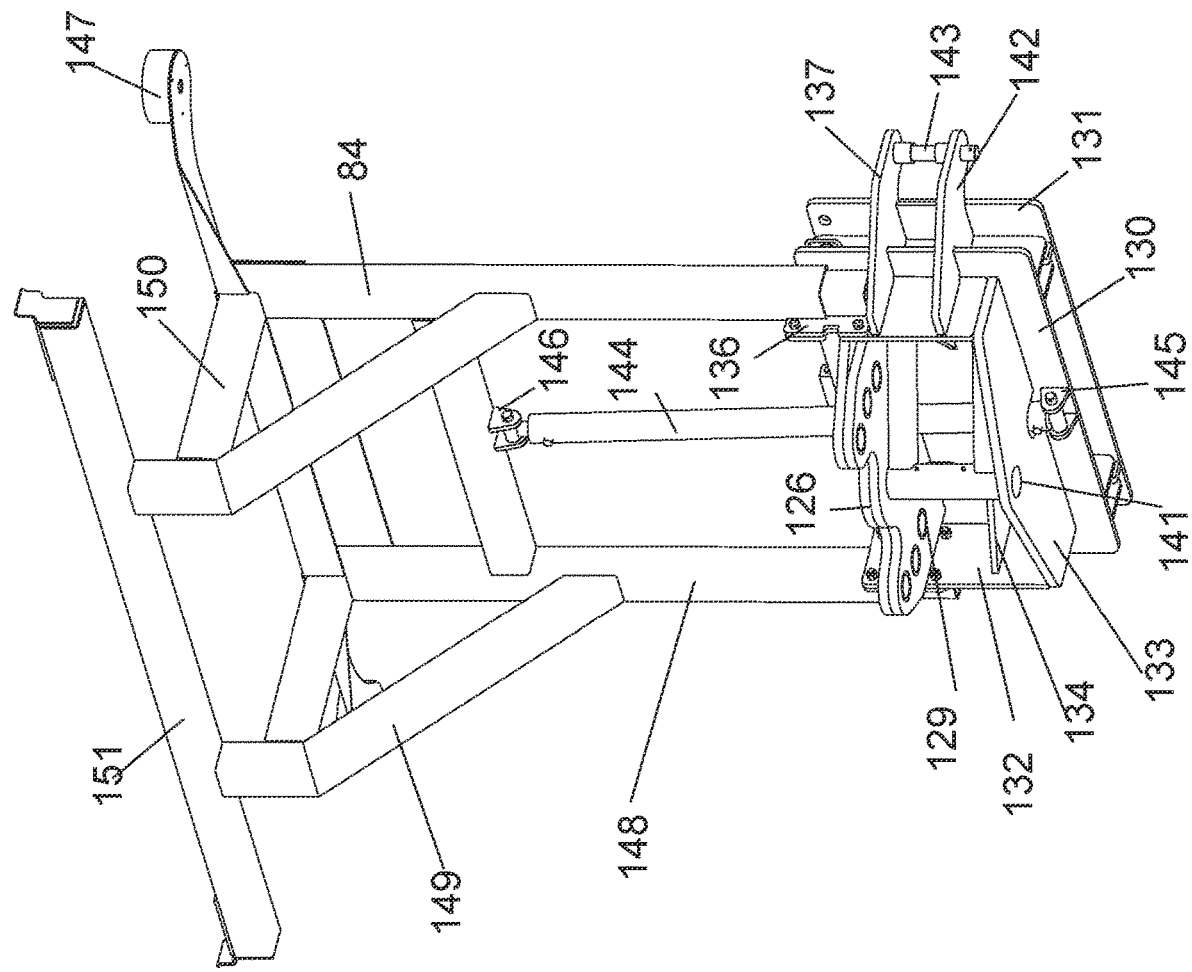
FIG. 14 is a bottom perspective view of the pivoting assembly and the rack for supporting the impact attenuator.

FIG. 14 is a bottom perspective view of the pivoting assembly and the rack for supporting the impact attenuator. Like numerals will be used to identify components already discussed. Thus, FIG. 14 shows the pivoting assembly plate 126. Also visible in FIG. 14 are the locking pin holes 129. The main plate 130 and the attenuator attachment plate 131 are shown, as are the reinforcing gussets 134 and the mounts 136 for the rack 84. Side plates 132 and bottom plate 133 are shown. As can be seen in FIG. 14 bottom plate 133 has a hole 141 therein through which the central pivot pin 96 passes. Reinforcing tubes 135 shown again in FIG. 14 provide further structural support to the assembly.

Also visible in FIG. 14 are the hydraulic cylinder bracket upper plate 137 and hydraulic cylinder bracket lower plate 142. Each of the hydraulic cylinder bracket upper and lower plates 137 and 142 may be provided with a sleeved holes to accept a pin 143 which connects the hydraulic cylinder 93 to the pivoting assembly 82. FIG. 14 also shows a rack adjusting cylinder 144. Rack adjusting cylinder 144 may raise and lower the height of the rack 84 as necessary to accommodate the attenuator (not shown) in either the deployed or un-deployed positions. By way of example and without limitation, rack adjusting cylinder may be a 48 inch stroke cylinder. The rack adjusting cylinder 144 may be attached to the pivoting assembly 82 by lower mount 145 and may be further attached to the rack 84 by upper mount 146. The rack 84 may be further provided with a light mount 147. The rack 84 consists of uprights 148, braces 149, horizontal members 150 and bar 151 on which the attenuator rests when in an un-deployed position.

Figure 15:
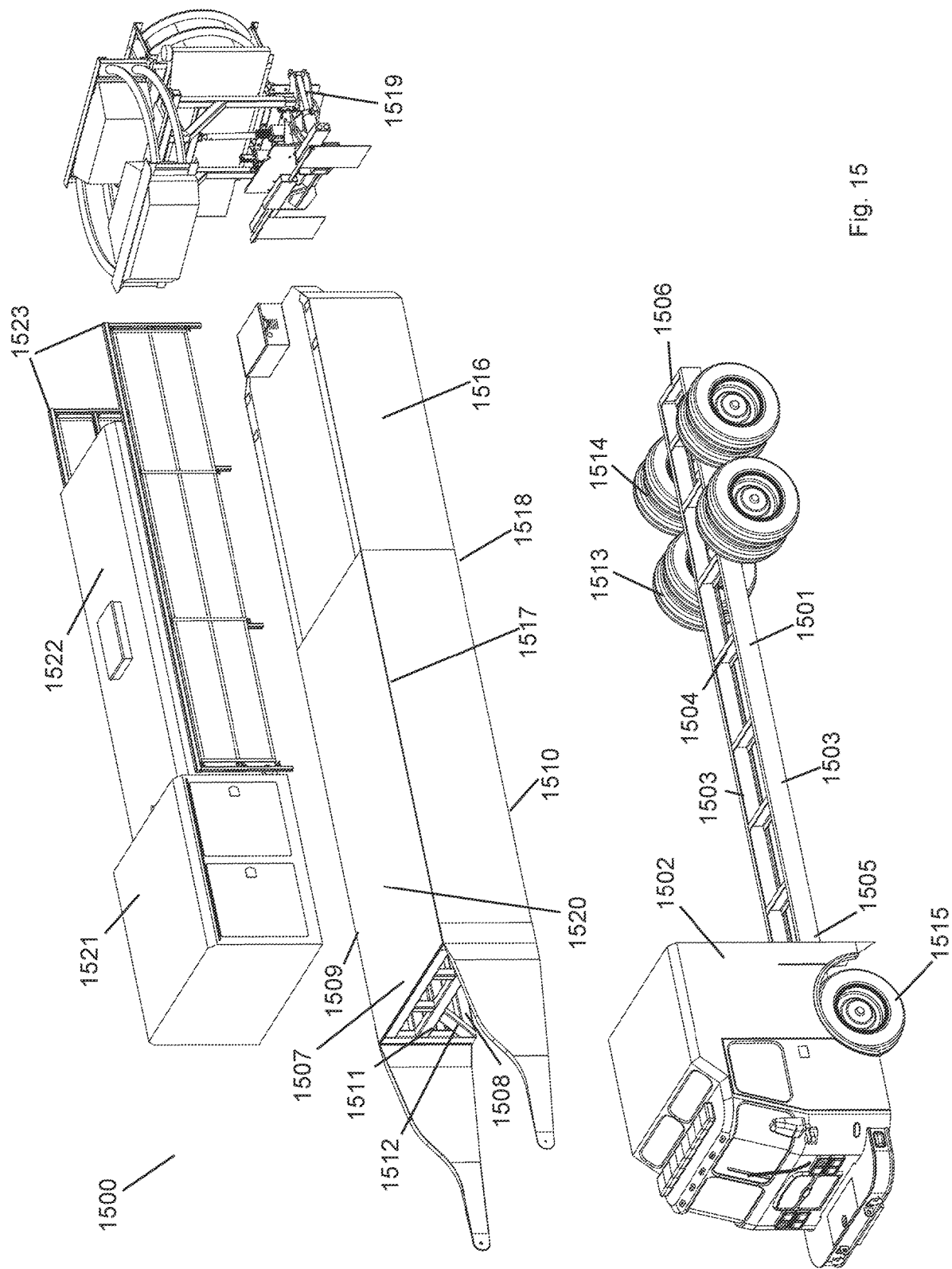
FIG. 15 is an exploded view of a second embodiment of the emergency response barrier.
Figure 16:
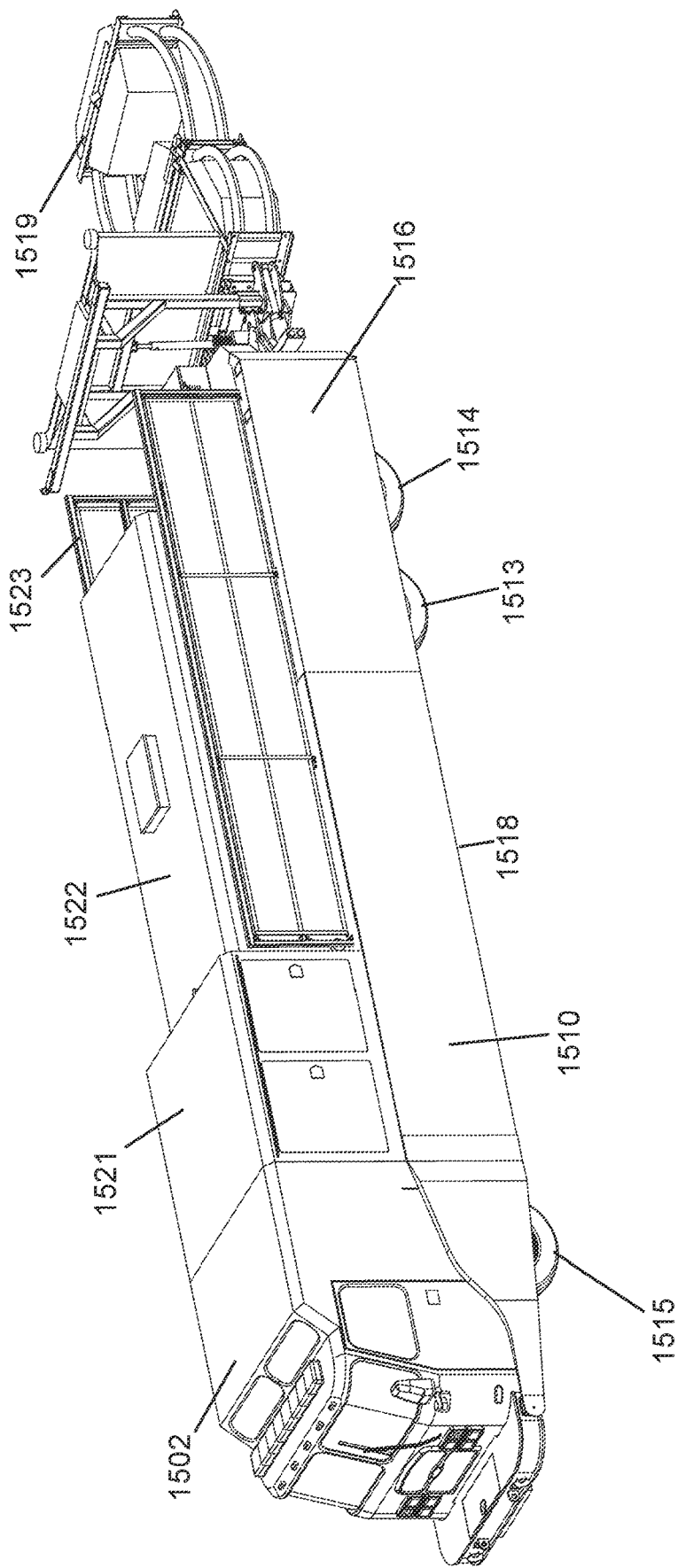
FIG. 16 is a left perspective view of a second embodiment of the emergency response barrier.

FIGS. 15-17 show a second embodiment of the emergency response barrier. In this second embodiment of FIGS. 15-17, the barrier and the vehicle which transports it are one single unit, instead of being separate as shown in the first embodiment of FIGS. 1-4. As can best be seen in the exploded view of FIG. 15, the emergency response barrier vehicle 1500 may be provided with a chassis 1501 coupled to a cab 1502. It should be appreciated that the cab overlies an engine (not shown) that powers the vehicle 1500's movement. The chassis may be provided with parallel longitudinal members 1503 and cross-members 1504. The chassis extends from the front end 1505 to the rear end 1506 of the emergency response barrier 1507. barrier 100. The barrier 1507 may be further provided with reinforcing bracing 1508 extending along the majority of the right and left sides, 1509 and 1510 respectively, of the barrier 1507. In one embodiment, the reinforcing bracing 1508 may comprise traverse members 1511, with a plurality of intersecting cross-braces 1512.

As can be seen in FIGS. 15-17, the barrier vehicle 1500 may be provided with two axles with wheels, 1513 and 1514, coupled to the chassis 1501 at the rear end 1506 thereof. It should be appreciated that the same axles connect the left side and right side wheels, so there is a common axle between each of the right and left side wheels, as is known in the art. Alternatively, the left and right side wheels could be coupled to the chassis 1501 by, for example, a fixed spindle, and without the use of an axle. Any means known in the art for coupling wheels to a frame is encompassed with this disclosure. The vehicle 1500 is also provided with a front axle and wheels 1515. It should be appreciated that the output of the engine could be coupled to just the front axle and wheels 1515, to just the rear axles and wheels 1513 and 1514 or to all the axles and wheels. Thus, the vehicle 1500 may be front-wheel drive, rear-wheel drive or all-wheel drive. It should be further appreciated that the wheels attached to axles 1513 and 1514 are not capable of steering, and rotate in a straight forward (or backward) direction without any articulation. Air bags may be attached to the wheels and axles to allow for the selective raising, lowering and leveling of the barrier vehicle 1500. Valves may be provided to hold the air suspensions settings after an air source provided by the towing vehicle has been removed. Optionally, a ballast may be provided to increase the overall weight of the barrier.

The barrier vehicle 1500 may also be provided with a substantially planar skin 1516 that covers the reinforcing bracing 1508. The substantially planar skin 1516 extends along the right and left sides, 1509 and 1510 respectively. Further, the substantially planar skin 1516 extends from a top 1517 of the barrier 1507 down to a lower edge 1518. The substantially planar skin 1516 covers a majority of the wheels 1513, 1514 and 1515 on each side of the barrier vehicle 1500. The substantially planar skin 1516 performs a deflection function by presenting a smooth surface to impacting vehicles, such that they will be redirected away from barrier vehicle 1500 instead of entangling with the barrier vehicle 1500. The substantially planar skin 1516 also helps to protect the barrier vehicle 1500 and it prevents snag points, pocketing and underrides. Snag points are for example, wheel wells where an errant vehicle can catch on the barrier. They cause more abrupt ride down forces to errant drivers, and transfer more energy into the barrier. Similarly, pocketing is where the side of the errant vehicle pushes in. It has the same effect as a snag point, causing a more abrupt stop, and transferring more energy into the barrier. Underrides occur when errant vehicles become wedged under the barrier vehicle 1500. It should be appreciated that the substantially planar skin may be formed from any material of suitable strength for the application, including without limitation, steel plate, hardened aluminum, etc. The substantially planar skin 1516 may be fastened to the barrier 1507 by any means known in the art.

An impact attenuator 1519 may be provided on the barrier vehicle 1500. The impact attenuator 1519 is designed to absorb some of an impacting vehicle's kinetic energy and also to re-direct an impacting vehicle away from the barrier vehicle 1500. The impact attenuator 1519 may, for example, be designed to partially or completely crumple to absorb kinetic energy from the impacting vehicle. The impact attenuator 1519 may take the form of known attenuators in the art, or it could be specially designed for this application. The impact attenuator is coupled to the barrier vehicle 1500 by the same structure that is disclosed in FIGS. 8 through 14 for attaching the impact attenuator to barrier vehicle, to allow for the adjustability of angle of the impact attenuator is disclosed. As was previously disclosed in relation to the first embodiment in FIGS. 7a and 7b, the impact attenuator 1519 may be disposed at an angle to the rear end 1506 of the barrier vehicle 1500. As previously disclosed, the impact attenuator 1519 can be angled toward the right side 1509 or left side 1510 of the barrier vehicle 1500. In this way, the emergency response barrier vehicle 1500 may be parked diagonally across several lanes of traffic, and the impact attenuator may be angled in such a way that its rear end is oriented perpendicular to the flow of traffic. In this way, the impact attenuator can perform its function of absorbing the impact of a vehicle impacting the rear of the barrier while, and the barrier can shield emergency rescue work being done in multiple lanes of traffic.

The barrier 1507 may be provided with a flat top 1520. Disposed on top of the barrier may be storage box 1521. Additionally, a water tank 1522 may provided on the flat top 1520 of the barrier 1507. Unlike the water tanks described in FIGS. 5 and 6, tank 1522 does not extend into the barrier cross-bracing, and its volume is smaller than the tanks described in relation to the first embodiment. Further, the water tank 1522 may be provided with a T-shaped outlet (not shown) oriented toward the rear end of the barrier. This T-shaped outlet allows the water in water tank 1522 to be accessed from either side of the emergency response barrier vehicle 1500, depending on its orientation to on-coming traffic and an accident scene. Visual barriers 1523 may be provided to block the view of an accident scene from the view of on-coming motorists.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

The invention claimed is:

1. An emergency response barrier vehicle comprising:
   a chassis, having a cab and an engine for propelling the vehicle coupled thereto;
   a frame coupled to the chassis having a right side, a left side, a front end and a rear end, said frame further comprising reinforcing bracing extending along the majority of the right and left sides of the frame;
   a plurality of axles coupled to the chassis, each of said axles having wheels attached thereto;
   wherein the frame is covered with a substantially planar skin that extends along the right and left sides of the frame, wherein the substantially planar skin extends from a top of the frame down to a lower edge and wherein said substantially planar skin covers a majority of the wheels on each side of the vehicle;
   an impact attenuator coupling on the rear of the frame, said impact attenuator coupling comprising a vertical pin, wherein said vertical pin is received in a bore disposed in an impact attenuator, and wherein said impact attenuator is configured for rotation about the vertical axis of the pin;

at least one hydraulic cylinder connected between the rear of the frame and the impact attenuator, wherein retraction and extension of said at least one hydraulic cylinder moves the impact attenuator through an arc of rotation about the vertical pin.

2. The emergency response barrier vehicle of claim 1, wherein a flat deck covers the top of the frame.

3. The emergency response barrier vehicle of claim 2 further comprising a water tank disposed on top of the flat deck and secured thereto.

4. The emergency response barrier vehicle of claim 3, wherein the water tank is provided with a T-shaped outlet at the front end of the frame.

5. The emergency response barrier vehicle of claim 1, wherein corners of the frame at the rear end are angled and the substantially planar skin follows the angle of the corners.

6. The emergency response barrier vehicle of claim 1, wherein the impact attenuator further comprises signage to direct traffic in a direction away from the barrier.

7. The emergency response barrier vehicle of claim 6, wherein signage is powered by a solar panel attached to the impact attenuator.

8. The emergency response barrier vehicle of claim 6, wherein a battery pack is provided at the rear end of the barrier for powering the signage.

9. The emergency response barrier vehicle of claim 2, further comprising a tank of firefighting chemicals disposed on the flat deck.

10. The emergency response barrier vehicle of claim 2, further comprising storage boxes disposed on the flat deck.

11. The emergency response barrier vehicle of claim 1, further comprising warning beacons at the corners of the barrier vehicle.

12. The emergency response barrier vehicle of claim 1, further comprising running lights, LED strips and conspicuity tape on the substantially planar skin on the left and right sides of the barrier vehicle.

13. The emergency response barrier vehicle of claim 1, further comprising a visual barrier attached to the top of the frame along the right and left sides thereof.

14. The emergency response barrier vehicle of claim 13, wherein the visual barrier is received in pockets disposed along the left and right edges of the top of the frame.

15. The emergency response barrier vehicle of claim 1, wherein the at least one hydraulic cylinder is controlled by a wireless controller.

16. The emergency response barrier vehicle of claim 1, wherein the at least one hydraulic cylinder is controlled by a wired controller.

17. The emergency response barrier vehicle of claim 1, wherein the reinforcing bracing comprises a plurality of parallel longitudinal members with a plurality of intersecting cross-braces disposed between and connected to the parallel longitudinal members.

18. The emergency response barrier vehicle of claim 17, wherein the reinforcing bracing further comprises bracing connected a 45° angle between the parallel longitudinal members and the intersecting cross-braces.

19. The emergency response barrier vehicle of claim 1, wherein the vehicle is front-wheel drive, rear-wheel drive or all-wheel drive.

20. The emergency response barrier vehicle of claim 1, wherein air bags are attached to the axles to allow for the selective raising, lowering and leveling of the barrier vehicle.

\* \* \* \* \*